April 24, 1934.  R. D. SMITH  1,955,981
METHOD OF CASTING METAL FIXTURES ON GLASS ARTICLES
Filed Dec. 16, 1931
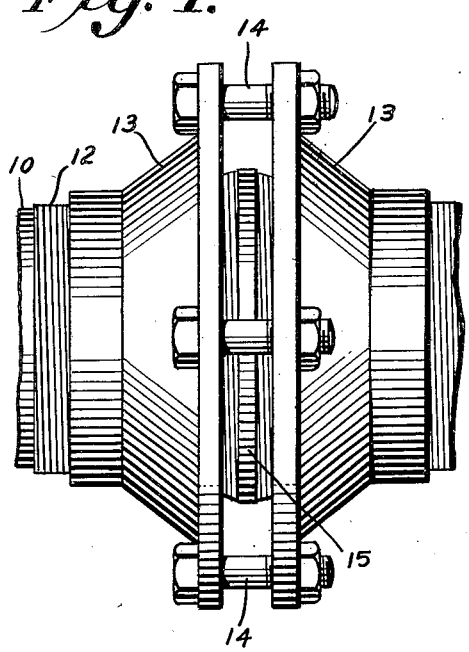
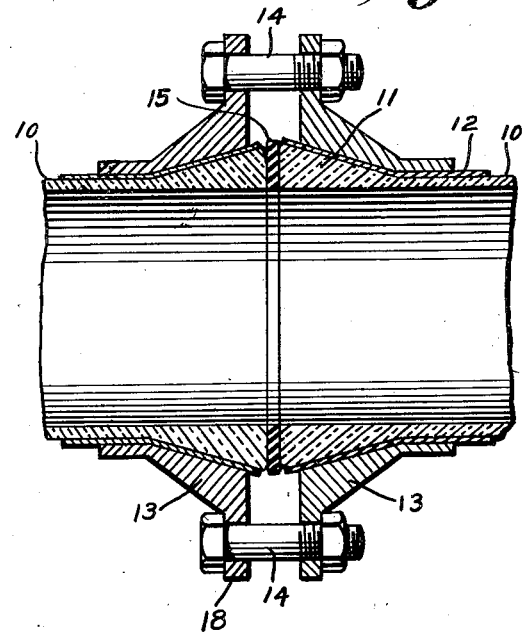
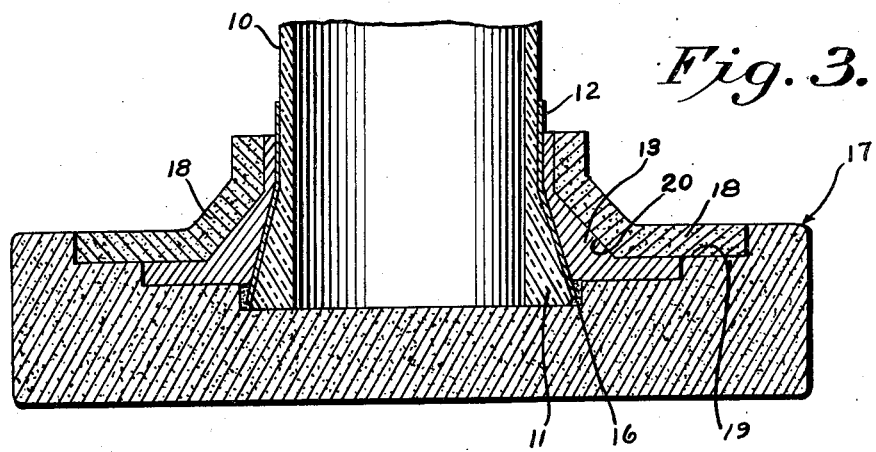
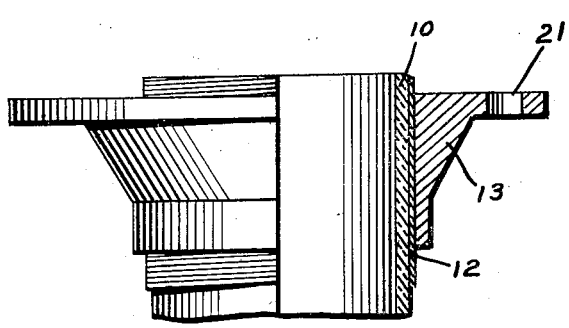
INVENTOR.
ROWLAND D. SMITH.
BY Dorsey & Cole
ATTORNEYS.

Patented Apr. 24, 1934

1,955,981

UNITED STATES PATENT OFFICE 1,955,981

METHOD OF CASTING METAL FIXTURES ON GLASS ARTICLES

Rowland D. Smith, Corning, N. Y., assignor to Corning Glass Works, Corning, N. Y., a corporation of New York Application December 16, 1931, Serial No. 581,498

3 Claims. (Cl. 22—202)

This invention relates to the art of joining metal and glass and more particularly to metal joints for glass pipe and it has for its object to form metal fixtures on glass articles.

Another object of the invention is to connect glass pipe together to form a continuous line.

In joining metal to glass difficulties are often encountered due to the difference in expansion coefficients of the metal and glass and this is more particularly the case when the attempt is made to seal large metallic bodies to glass.

Glass pipe lines are often desirable for conveying corrosive liquids and gases which would attack metal or for conveying liquids which must be kept pure and free from contamination. The use of glass for this purpose has been greatly retarded however due to the difficulty encountered in joining separate lengths of glass pipe together to form a continuous line which will not leak.

The use of metal couplings on glass pipe is attended by difficulties which have heretofore limited such use. The chief difficulty is the usual lack of perfect cross sectional rotundity in commercially produced glass tubing on account of which ordinary metal couplings seldom conform to the shape of the pipe and when attached thereto are liable to cause unsymmetrical strain in the glass.

The method of connecting sections of glass pipe by welding or fusing is often used for pipe of relatively small size, say less than about 1" diameter, as for example in the construction of laboratary apparatus, neon signs, and the like, but for larger sizes where the sections are welded in situ during installation this method is impractical on account of the difficulty of properly annealing such joints after installation so as to remove unsymmetrical strains from the glass.

Metal pipes are often joined by means of flanged couplings which may be integral with the pipe or adapted thereto by screw threads. Due to the fragile character of glass and the lack of flexibility in such joints this method has heretofore been considered impractical for joining glass pipes.

By means of my invention I am able to couple separate lengths of glass pipe together to form continuous lines which will not leak at the joints.

My invention also further enables me to form relatively large metallic fixtures on glass articles regardless of the size and configuration of the articles.

In general, my invention consists in placing a layer of heat resisting cushioning material, such as asbestos, around glass articles and casting molten metal around the cushioning material so that when the metal cools and solidifies the compressional stresses caused by contraction of the metal will be absorbed by the cushioning material thus leaving the glass free from injurious strain.

The invention will be better undertood by referring to the drawing, in which:

Fig. 1 represents a side view of a joint between two glass pipes held together by metal flanges made in accordance with my invention;

Fig. 2 is a longitudinal sectional view of the same joint;

Fig. 3 is a sectional view of a mold showing the end of a glass pipe around which a metal flange has been formed in accordance with my invention; and Fig. 4 is a side view, partly in section, of a modified form of pipe joint made in accordance with my invention.

In Figs. 1 and 2 of the drawing is shown one embodiment of my invention comprising a pair of glass pipe sections 10, the opposite ends of each of which are preferably upset or thickened as at 11. Surrounding each upset or thickened end 11 of each pipe section is a layer of heat resisting cushioning material such as asbestos 12 and formed over the cushioning layer 12 are metallic flanges 13 which are pierced at spaced intervals for the reception of bolts 14 by means of which the flanges are adapted to be drawn together to bring the ends of the pipe sections into abutting relation. In order to make a completely tight joint I preferably interpose between adjacent ends of the pipe sections a gasket 15 of a relatively soft material such as rubber, asbestos or the like.

In practicing my invention I coat the glass to which the metal is to be secured with a solution of water glass or sodium silicate or other heat resisting adhesive and then tightly wrap thereon one or more layers of asbestos yarn 12. I then heat the glass and wrapping to a temperature of about 150° C. in order to insure adhesion of the asbestos yarn to the glass and to guard against too great heat shock in the subsequent treatment. The end of the pipe so cushioned and heated is then placed in a vertical position in the recess 16 of a mold 17 after which the space between the wall of the recess 16 and the glass part is filled with asbestos, sand or other suitable material for a purpose to be more fully hereinafter described. A mold ring 18 composed of two or more sections is then seated in a recess 19 formed in the upper face of the mold 17 and cooperates therewith in defining a mold cavity 20 for the reception of molten metal.

The mold 17 and the ring 18 are preferably made of graphite, though other refractory substances may be used.

After the glass part has been assembled as above described, molten metal is poured into the mold cavity around the cushioned end of the glass pipe to form a metal casting 13 which in effect is a uniting part of the pipe. In preparing the molten metal I preferably use an alloy having a melting point below the annealing point of the glass, say not higher than 500° C. in order to avoid the necessity of re-annealing the glass after the casting operation is completed. I have found that an alloy of zinc, aluminum and copper composed of 92.9% zinc, 4% aluminum, 3% copper and .1% magnesium is particularly suitable because it has a relatively high tensile strength and a low melting point, this alloy melting at 393° C. In pouring the molten metal around the cushioned end of the pipe care must be exercised to avoid contact of the hot metal with the glass as such contact might cause the latter to crack. In order to prevent the hot metal from coming in direct contact with the glass the asbestos winding is extended well beyond the upset end of the pipe and hence will extend above the top of the mold. Moreover, by packing the recess 16 with sand or asbestos, as above described, the molten metal at the bottom of the mold is kept out of direct contact with the glass.

After the molten metal has solidified the pipe and flange are removed from the mold and the projecting end of the pipe is ground to an accurate right angle with the longitudinal axis of the pipe but I prefer that such grinding does not bring the glass flush with the flange. After preparing the flanged pipe as above set forth, the rim of the flange is drilled as at 21 for the reception of the bolts 14 above referred to. If desired the holes 21 may be formed during casting by providing cores or pegs in the mold in the manner known in the metal casting art.

In assembling the flanged pipes the projecting ends of the glass are coated with suitable cement after which a gasket 15 of any desired material is inserted between the ends of the pipes which latter are tightly drawn together by means of the bolts 14. For a permanent installation I have found that water glass forms a satisfactory cement as it is resistant to acids and organic liquids. I have also found that Bakelite cement is quite satisfactory as it is resistant to both acids and alkalies. For temporary installations the use of rubber gaskets without cement is preferable.

Other metals suitable for preparing metal flanges in accordance with my invention are aluminum, lead antimony alloys and etc. In using aluminum it is necessary to cool the cast flange slowly in order to re-anneal the glass since the melting point of aluminum is above the annealing point of glass. Lead antimony alloys may be employed as above described with good results since they have relatively low melting points. Obviously metals and alloys such as iron, copper, brass, and the like, whose melting points are above the softening point of the glass are unsuitable due to the liability of the glass to become soft enough to lose shape. It is also obvious that in using metals or alloys whose melting points are below the annealing point of the glass these should not be heated to a temperature greatly above the annealing point of the glass if it is desired to avoid subsequent annealing.

The molten metal readily conforms to the shape of both the pipe and the cushioning layer, the contraction of the metal on cooling holds it firmly attached to the glass and the cushioning layer absorbs the stress due to contraction so that the glass remains free from injurious strain. Furthermore, the use of an alloy with a melting point below the annealing point of the glass avoids the introduction of strain from heat shock. Although I prefer to use the thickened or upset tapered end on the pipe as shown, on account of the greater resistance to pull exerted on the flanges, I have also successfully applied my invention to pipe with straight ends as shown in Fig. 4.

It will be apparent that my invention is not confined to the above described embodiment but that it may be applied in many cases where it is desired to attach metal fittings to glass articles such as insulators, and the like and, consequently, I do not wish to be restricted except as indicated by the scope of the following claims.

What I claim is:

1. The method of casting metal fixtures on hollow glass articles which includes placing a cushioning layer of asbestos yarn around the glass article, placing the cushioned portion of the article in a mold and pouring molten metal into the mold around the cushioned portion of the article.

2. The method of casting metal fixtures on glass pipes which includes coating the glass with water glass, wrapping a layer of asbestos yarn thereon, heating the portion so treated to about 150° C., placing the heated cushioned portion of the pipe in a mold and pouring molten metal into the mold to fill the mold and encircle the cushioned portion of the pipe.

3. The method of uniting metal with hollow glass articles which includes providing the article with a cushioning layer of asbestos yarn and pouring onto and around the cushioned portion of the article molten metal whose melting point is below the annealing point of the glass and cooling the metal so that it solidifies in contact with the cushioned portion of the article.

ROWLAND D. SMITH.